US010847771B2

(12) United States Patent
Goitsuka et al.

(10) Patent No.: US 10,847,771 B2
(45) Date of Patent: Nov. 24, 2020

(54) COOLING ARRANGEMENT FOR A VEHICLE BATTERY SYSTEM

(71) Applicant: TOYOTA JIDOSHA KABUSHIKI KAISHA, Toyota-shi (JP)

(72) Inventors: Shinya Goitsuka, Okazaki (JP); Koichi Tanaka, Okazaki (JP); Hiroya Mizuta, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 438 days.

(21) Appl. No.: 15/819,714

(22) Filed: Nov. 21, 2017

(65) Prior Publication Data

US 2018/0175350 A1 Jun. 21, 2018

(30) Foreign Application Priority Data

Dec. 19, 2016 (JP) .................. 2016-245123

(51) Int. Cl.
*H01M 2/10* (2006.01)
*H01M 2/02* (2006.01)
(Continued)

(52) U.S. Cl.
CPC ............ *H01M 2/1083* (2013.01); *B60K 1/04* (2013.01); *B60K 6/28* (2013.01); *B60L 50/10* (2019.02); *B60L 50/64* (2019.02); *B60L 50/66* (2019.02); *B60L 53/122* (2019.02); *B60L 53/18* (2019.02); *B60L 58/20* (2019.02); *B60L 58/26* (2019.02); *H01M 2/0262* (2013.01); *H01M 2/0285* (2013.01); *H01M 2/1077* (2013.01); *H01M 2/206* (2013.01); *H01M 10/625* (2015.04); *B60K 2001/005* (2013.01); *B60K 2001/0416* (2013.01); *B60K 2001/0438* (2013.01); *B60L 2240/545* (2013.01); *H01M 10/6569* (2015.04);
(Continued)

(58) Field of Classification Search
CPC .......................................... B60L 53/12
USPC .......................................... 320/109
See application file for complete search history.

(56) References Cited

U.S. PATENT DOCUMENTS

2010/0181129 A1* 7/2010 Hamidi ............... B60L 53/80
180/68.5
2012/0125702 A1* 5/2012 Bergfjord ............ B60K 1/04
180/65.1
(Continued)

FOREIGN PATENT DOCUMENTS

CN 102741077 A 10/2012
DE 10 2016 208 902 A1 12/2016
(Continued)

OTHER PUBLICATIONS

Machine translation of WO-2014073150-A1. (Year: 2020).*
(Continued)

*Primary Examiner* — David V Henze-Gongola
(74) *Attorney, Agent, or Firm* — Sughrue Mion, PLLC (57) ABSTRACT

Provided is a vehicle including: an internal battery pack that has an internal battery module and an internal case housing the internal battery module, and is disposed inside the vehicle; and an external battery pack that has an external battery module and an external case housing the external battery module, and is disposed outside the vehicle, wherein an air exchange rate of the internal case is higher than an air exchange rate of the external case.

7 Claims, 8 Drawing Sheets

(51) Int. Cl.

| | | |
|---|---|---|
| *H01M 2/20* | (2006.01) | |
| *B60K 6/28* | (2007.10) | |
| *B60K 1/04* | (2019.01) | |
| *H01M 10/625* | (2014.01) | |
| *B60L 58/20* | (2019.01) | |
| *B60L 50/60* | (2019.01) | |
| *B60L 50/64* | (2019.01) | |
| *B60L 58/26* | (2019.01) | |
| *B60L 50/10* | (2019.01) | |
| *B60L 53/122* | (2019.01) | |
| *B60L 53/18* | (2019.01) | |
| *H02J 7/02* | (2016.01) | |
| *H02J 7/00* | (2006.01) | |
| *H01M 10/6569* | (2014.01) | |
| *B60K 1/00* | (2006.01) | |

(52) U.S. Cl.
CPC ........ *H01M 2220/20* (2013.01); *H02J 7/0045* (2013.01); *H02J 7/025* (2013.01); *Y02T 10/70* (2013.01); *Y02T 10/7072* (2013.01); *Y02T 90/12* (2013.01); *Y02T 90/14* (2013.01)

(56) References Cited

U.S. PATENT DOCUMENTS

| | | | |
|---|---|---|---|
| 2014/0196964 A1* | 7/2014 | Hayashi | B60K 6/28 180/65.21 |
| 2015/0069964 A1 | 3/2015 | Kamikihara et al. | |
| 2016/0347161 A1 | 12/2016 | Kusumi et al. | |
| 2017/0080817 A1* | 3/2017 | Hancasky | B60L 53/126 |

FOREIGN PATENT DOCUMENTS

| | | |
|---|---|---|
| EP | 2 752 324 A1 | 7/2014 |
| JP | 10-255746 A | 9/1998 |
| JP | 2011-121483 A | 6/2011 |
| JP | 2015-79605 A | 4/2015 |
| JP | 5741695 B2 | 5/2015 |
| RU | 2473159 C1 | 1/2013 |
| RU | 135189 U1 | 11/2013 |
| WO | 2010/082275 A1 | 7/2010 |
| WO | 2011/016771 A1 | 2/2011 |
| WO | 2012/006734 A1 | 1/2012 |
| WO | 2013/030884 A1 | 3/2013 |
| WO | 2014/073150 A1 | 5/2014 |
| WO | WO-2014073150 A1 * | 5/2014 ............. B60L 1/003 |

OTHER PUBLICATIONS

U.S. Appl. No. 15/684,457, filed Aug. 23, 2017 (40 pages) by Shinya Goitsuka.

Extended European Search Report dated Jun. 13, 2018 issued by the European Patent Office in counterpart application No. 17203150.2.

Communication dated Oct. 15, 2019 from the Intellectual Property of India in application No. 201714041031.

* cited by examiner

COOLING ARRANGEMENT FOR A VEHICLE BATTERY SYSTEM

INCORPORATION BY REFERENCE

The disclosure of Japanese Patent Application No. 2016-245123 filed on Dec. 19, 2016 including the specification, drawings and abstract is incorporated herein by reference in its entirety.

BACKGROUND

1. Technical Field

The present disclosure relates to a vehicle, and more particularly to a vehicle equipped with an internal battery pack and an external battery pack.

2. Description of Related Art

The vehicle described in Japanese Patent No. 5741695 below is equipped with an internal battery pack installed inside the vehicle cabin and an external battery pack installed outside the vehicle cabin.

SUMMARY

The external battery pack disposed outside the vehicle cabin as in the above vehicle tends to be exposed to outside air. Moreover, when the external battery pack is disposed under a floor panel as in the vehicle described in Japanese Patent No. 5741695, foreign substances such as dust, small stones, and rainwater thrown up by wheels can enter the external battery pack. Since the environment surrounding the internal battery pack contains a smaller amount of foreign substances such as dust, small stones, and water than the environment surrounding the external battery pack, the possibility of such foreign substances entering the internal battery pack is lower than the possibility of their entering the external battery pack.

Being exposed to outside air, the external battery pack is easily cooled by a traveling wind while the vehicle is running. By contrast, being disposed inside the vehicle, the internal battery pack is hardly cooled by a traveling wind.

Because of this difference in the surrounding environment between the internal battery pack and the external battery pack, required dustproofing (waterproofing) performance and cooling performance are different between the internal battery pack and the external battery pack.

Nevertheless, conventional vehicles have never taken into account the properties of cases of the internal battery pack and the external battery pack with focus on the difference in the required dustproofing (waterproofing) performance and cooling performance between the internal battery pack and the external battery pack.

The present disclosure provides a vehicle equipped with an internal battery pack and an external battery pack in which the dustproofing (waterproofing) performance and the cooling performance of the internal battery pack and the external battery pack are secured according to their respective surrounding environments.

A vehicle according to the present disclosure includes: a first battery pack that has a first battery module and a first case housing the first battery module, and is disposed inside the vehicle; and a second battery pack that has a second battery module and a second case housing the second battery module, and is disposed on a bottom surface of the vehicle located on an outer side of the vehicle. An air exchange rate of the first case is higher than an air exchange rate of the second case.

According to this vehicle, the air exchange rate of the first case is higher than the air exchange rate of the second case.

Here, the air exchange rate (times/24 hours) is a value obtained by dividing an amount of air exchanged within 24 hours by an internal volume (air volume) of the battery case. In other words, the air exchange rate is a value that indicates how many times air inside the battery is replaced within 24 hours.

Since internal air contains a smaller amount of foreign substances than external air, there is a lower risk of foreign substances entering the first case despite the high air exchange rate thereof. Moreover, the temperature rise of the first battery module can be suppressed, as air inside the first case warmed by the first battery module is easily replaced with air at a comparatively low temperature present outside the first case due to the high air exchange rate.

The second battery pack, on the other hand, has a low air exchange rate, so that air outside the second battery pack does not easily enter the second battery pack. Thus, external foreign substances such as dust can be kept from entering the second battery pack. In addition, the second battery module can be securely cooled, as the second battery pack is easily cooled by outside air such as a traveling wind.

The vehicle according to the present disclosure may further include an engine and an exhaust pipe connected to the engine. The exhaust pipe may be provided on the bottom surface of the vehicle and disposed at a position adjacent to the second case.

According to this vehicle, the second case is warmed by heat from the exhaust pipe. When the second case is warmed, water inside the second case is likely to vaporize into water vapor. In the second case, too, air inside the second case and air outside the second case are exchanged, and the water vapor inside the second case is also discharged to the outside of the second case as the air is replaced.

The vehicle according to the present disclosure may further include an electric power receiving device that is configured to receive electric power contactlessly from an electric power transmission device provided outside the vehicle. The electric power receiving device may be provided on a lower surface of the second case.

According to this vehicle, the temperature of the second case is raised by heat from the electric power receiving device when the electric power receiving device receives electric power. When the second case is warmed, water inside the second case is likely to vaporize into water vapor. In the second case, too, air inside the second case and air outside the second case are exchanged, and the water vapor inside the second case is also discharged to the outside of the second case as the air is replaced.

In the vehicle according to the present disclosure, when the second case and the first case are seen in a plan view from below the vehicle, the area of the second case may be larger than the area of the first case, and the electric power receiving device may be disposed on the lower surface of the second case.

According to this vehicle, the electric power receiving device is provided on the lower surface of the second case having a large area, so that a magnetic flux generated around the electric power receiving device while the electric power receiving device is receiving electric power can be kept from entering the vehicle. It is therefore possible to prevent the vehicle from being warmed by the magnetic flux generated around the electric power receiving device.

In the vehicle according to the present disclosure, the second case may be made of an alloy containing aluminum. According to this vehicle, any magnetic flux generated around the electric power receiving device that tries to enter the second case is reflected by the second case made of an alloy containing aluminum. As a result, the amount of magnetic flux entering the second case can be reduced, and the second case can be prevented from reaching an excessively high temperature.

The vehicle according to the present disclosure may further include a charging inlet to which a charging connector provided outside the vehicle is to be connected. The charging inlet may be electrically connected to the first battery module and the second battery module. The charging inlet may be provided in a peripheral surface of the vehicle.

According to this vehicle, damage to the inlet can be avoided even when the electric power receiving device is damaged by a fallen object etc. placed on a road surface. It is therefore possible to charge the first battery module and the second battery module from the inlet.

The vehicle according to the present disclosure may further include a first electric power cable connected to the electric power receiving device and the second battery pack, and a second electric power cable connected to the electric power receiving device and the first battery pack. The battery capacity of the second battery module may be larger than the battery capacity of the first battery module, and the length of the first electric power cable may be shorter than the length of the second electric power cable.

According to this vehicle, when the vehicle is crashed into by another vehicle etc., the possibility of breakage of the first electric power cable having a shorter cable length is lower than the possibility of breakage of the second electric power cable having a longer cable length. The first electric power cable is connected to the second battery pack having a large battery capacity. Thus, even when the second electric power cable breaks, the first electric power cable is connected to the second battery module having a large battery capacity, so that the second battery module having a large battery capacity can be charged.

According to the vehicle of the present disclosure, it is possible to secure the dustproofing (waterproofing) performance and the cooling performance of the internal battery pack and the external battery pack according to their respective surrounding environments.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An electrically-operated vehicle according to embodiments will be described using FIG. 1 to FIG. 7. Of the components shown in FIG. 1 to FIG. 7, those components that are the same or substantially the same may be denoted by the same reference signs to omit overlapping description.

Figure 1:
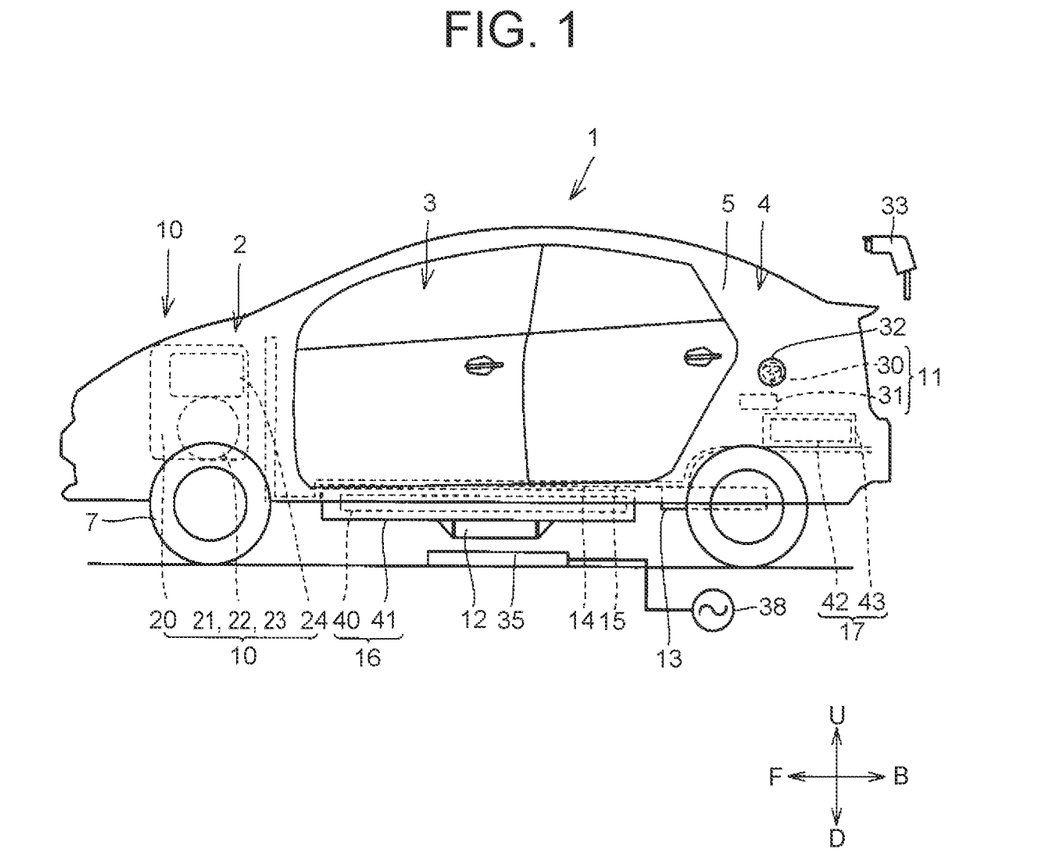
FIG. 1 is a side view schematically showing a vehicle 1.

Arrows U and D indicated in FIG. 1 etc. respectively indicate an upward direction and a downward direction. Arrows L and R respectively indicate a leftward direction and a rightward direction of the vehicle. Arrows F and B respectively indicate a frontward direction and a backward direction of the vehicle. <Embodiment 1> FIG. 1 is a side view schematically showing a vehicle 1. As shown in FIG. 1, an engine compartment 2, an occupant room 3, and a luggage room 4 are formed inside the vehicle 1.

An engine and other devices are installed in the engine compartment 2. The occupant room 3 is formed further on a back side than the engine compartment 2. The luggage room 4 is disposed further on the back side than the occupant room 3.

The vehicle 1 includes wheels 7, a driving device 10, a charging device 11, an electric power receiving device 12, a fuel tank 13, a floor panel 14 forming a bottom surface 15 of the vehicle 1, an external battery pack 16, and an internal battery pack 17. The vehicle 1 according to this embodiment can charge the external battery pack 16 and the internal battery pack 17 with electric power from a power source provided outside the vehicle 1 by means of the charging device 11 or the electric power receiving device 12.

The bottom surface 15 of the vehicle 1 formed by the floor panel 14 is located on an outer side of the vehicle 1. The external battery pack 16 is disposed on the bottom surface 15 of the vehicle 1, specifically on a lower surface of the floor panel 14. The internal battery pack 17 is housed inside a vehicle cabin (inside the vehicle 1), and is specifically disposed on an upper surface of the floor panel 14.

The driving device 10 includes an engine 20, rotating electric machines 21, 22, a power split device 23, and a PCU 24. Using fuel supplied from the fuel tank 13, the engine 20 generates a driving force for driving the wheels 7. The PCU 24 includes a converter and an inverter. The PCU 24 raises the voltage of direct-current power supplied from the external battery pack 16 and the internal battery pack 17, and converts the direct-current power with the raised voltage into alternating-current power. Using the alternating-current power supplied from the PCU 24, the rotating electric machine 21 generates power for driving the wheels 7. The PCU 24 can control the driving of the rotating electric machine 21, including the rotation speed thereof, by adjusting the frequency etc. of the alternating current supplied to the rotating electric machine 21.

The rotating electric machine 22 functions mainly as a power generator. The power split device 23 distributes power from the engine 20 to the wheels 7 and the rotating electric machine 22.

The charging device 11 includes an inlet 30 and a rectifier 31. A lid 32 is provided in a left side surface 5 of the vehicle 1, and as the lid 32 is opened, the inlet 30 is exposed to the outside. A charging connector 33 provided in a charging station etc. can be connected to the inlet 30. The rectifier 31 converts the alternating-current power, supplied from the charging connector 33 through the inlet 30, into direct-current power, and supplies this direct-current power to the external battery pack 16 and the internal battery pack 17.

The electric power receiving device 12 is disposed on a lower surface of the external battery pack 16. The electric power receiving device 12 receives electric power contactlessly from an electric power transmission device 35 that is disposed on a ground surface etc. The electric power transmission device 35 is connected to a power source 38.

The external battery pack 16 includes a battery module 40 and an external case 41 housing the battery module 40. The internal battery pack 17 includes a battery module 42 and an internal case 43 housing the battery module 42.

The air exchange rate of the internal case 43 is higher than the air exchange rate of the external case 41. This means that the hermetic property of the external case 41 is higher than the hermetic property of the internal case 43.

Figure 2:
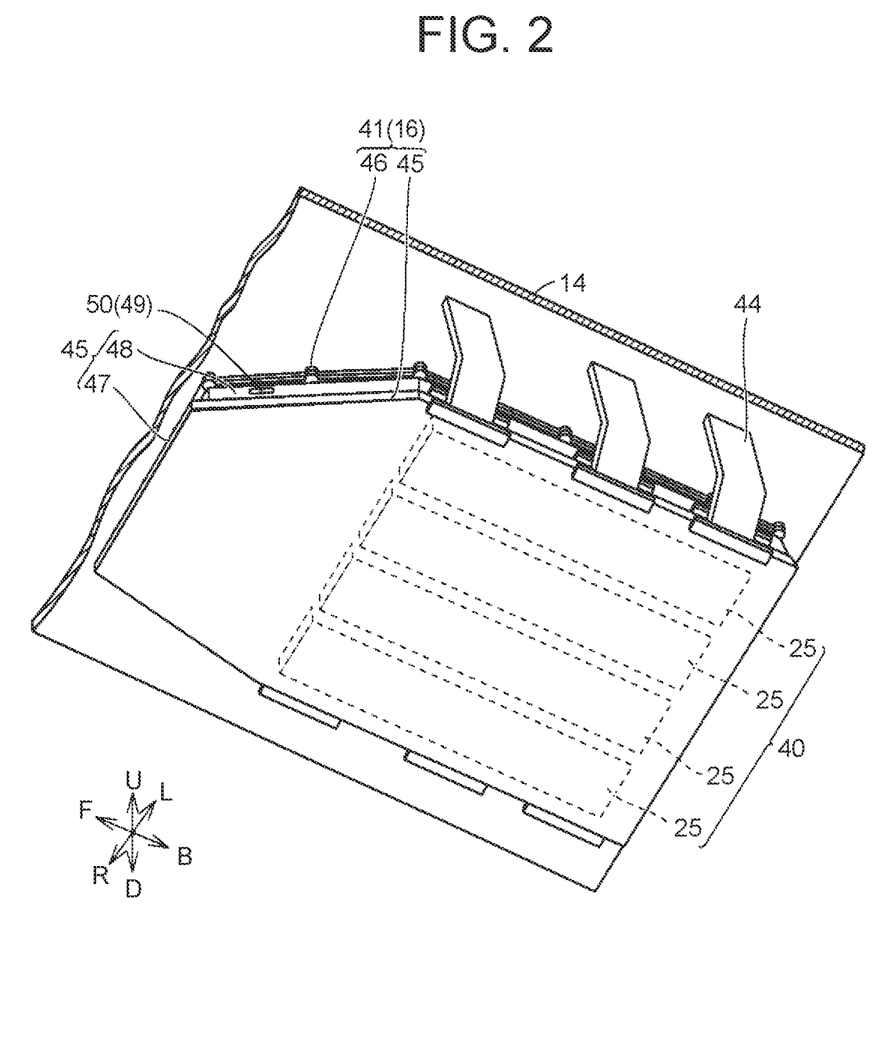
FIG. 2 is a perspective view showing an external battery pack 16.

FIG. 2 is a perspective view showing the external battery pack 16. As shown in FIG. 2, the external battery pack 16 is fixed to the lower surface of the floor panel 14 with a plurality of fixing members 44. The external case 41 includes a case main body 45 and a resin lid 46. An opening is formed at an upper side of the case main body 45, and the resin lid 46 covers this opening of the case main body 45.

An annular seal member or the like is disposed between the resin lid 46 and the case main body 45 to seal a clearance between the resin lid 46 and the case main body 45.

The case main body 45 includes a bottom plate 47 and a peripheral wall 48 that is formed so as to stand upright from the bottom plate 47. The case main body 45 is made of a metal containing aluminum, and is made of, for example, aluminum or an aluminum alloy. The case main body 45 is formed by die casting, and the bottom plate 47 and the peripheral wall 48 are integrally formed.

The peripheral wall 48 has a hole 49 formed therein, and a waterproof and moisture-permeable film 50 is provided in the hole 49.

For example, Gore-Tex® can be adopted as the waterproof and moisture-permeable film 50. Highly water-resistant, wind-resistant, and moisture-permeable, the waterproof and moisture-permeable film 50 can keep foreign substances such as water and dust from entering from outside the external case 41 into the external case 41. At the same time, the waterproof and moisture-permeable film 50 having high moisture permeability allows water vapor inside the external case 41 to pass therethrough to the outside of the external case 41. Air inside the external case 41 is discharged to the outside through the waterproof and moisture-permeable film 50, while air outside the external case 41 enters the external case 41 through the waterproof and moisture-permeable film 50.

The battery module 40 includes a plurality of battery units 25, and in the example shown in FIG. 2, the battery module 40 includes four battery units 25. Each battery unit 25 includes a plurality of single cells that are arrayed in a front-back direction of the vehicle 1, and each battery unit 25 is formed in a shape elongated in the front-back direction of the vehicle 1. The battery units 25 are disposed at intervals in a left-right direction of the vehicle 1.

Figure 3:
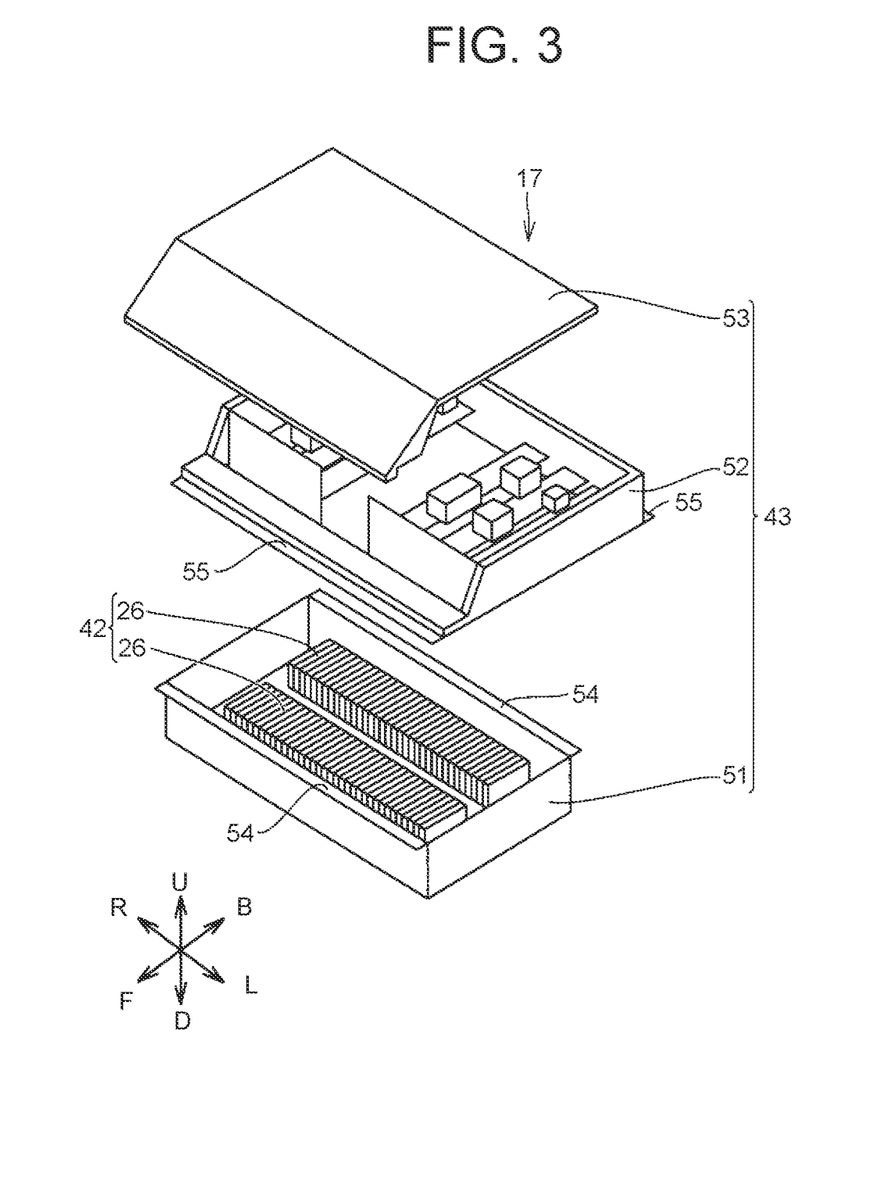
FIG. 3 is an exploded perspective view showing an internal battery pack 17.

FIG. 3 is an exploded perspective view showing the internal battery pack 17. As shown in FIG. 3, the internal case 43 includes a battery housing part 51 in which the battery module 42 is housed, a device housing part 52 disposed on the battery housing part 51, and a lid 53 disposed on the device housing part 52. The battery housing part 51 is formed in a shape that is closed at the bottom and open at the top.

The battery module 42 includes a plurality of battery units 26, and in the example shown in FIG. 3, the battery module 42 includes two battery units 26.

The device housing part 52 is formed in a frame-like shape that is open at the bottom and the top. Inside the device housing part 52, a plurality of plate-like beams are disposed, and a plurality of devices are disposed on these beams. Flanges 54 are formed at an opening edge of the battery housing part 51, and flanges 55 are formed at an opening edge on a lower side of the device housing part 52.

The flanges 54 and the flanges 55 are fixed together with screws etc. The flanges 54 and the flanges 55 are not formed in a closed shape, so that a clearance is left between the battery housing part 51 and the device housing part 52. Moreover, no seal member or the like is disposed between the flanges 54 and the flanges 55, so that a clearance is also left between the flanges 54 and the flanges 55.

The lid 53 is fixed with screws etc. on an upper side of the device housing part 52. Thus, a clearance is also left between the device housing part 52 and the lid 53.

Next, a method of measuring the air exchange rate of the external case 41 and the internal case 43 will be described. An air exchange rate n can be expressed by the following Formula (1).

$$Q/V \times 24 = n (\text{times}/24 \text{ hours}) \tag{1},$$

where Q is an amount of air exchanged (m³/h); V is the air volume of the external case 41 and the air volume of the internal case 43; Q/V is an air exchange rate per hour; and n is an air exchange rate per 24 hours. In this specification, the air exchange rate is denoted by n.

For example, when the air exchange rate per hour of the external case 41 is $Q_{41}/V_{41}$, to derive $Q_{41}/V_{41}$, first, a nitrogen gas is injected into the external case 41 in an indoor place until the oxygen concentration falls to 15% or below. Measurement of the oxygen concentration is started upon completion of injection of the nitrogen gas. The oxygen concentration inside the external case 41 changes as air inside the external case 41 is replaced with air outside the external case 41 over time. Then, this change in the oxygen concentration falls inside a predetermined range, and the change almost stops. By detecting this moment, $Q_{41}/V_{41}$ is calculated by the following Formula (2) when the oxygen concentration has stopped changing after the start of measurement.

$$p_0 - p = (p_0 - p_1)e^{-Q_{41}t/V_{41}} + k/Q_{41}(1 - e^{-Q_{41}t/V_{41}}) \tag{2},$$

where $V_{41}$ is the air volume (m³) of the external case 41; p is an oxygen concentration (%) after a time t has elapsed from the start of measurement; $p_0$ is an oxygen concentration (%) of outside air; $p_1$ is an initial oxygen concentration (%) inside the external case 41; k is an amount of oxygen (m³/h) generated inside the external case 41, which is zero in this embodiment since no oxygen is generated inside the external case 41; and t is a time (h) until the change in the oxygen concentration falls inside a predetermined range after the start of measurement of the oxygen concentration.

$Q_{41}/V_{41}$ can be calculated by the above Formula (2). Then, the air exchange rate $n_{41}$ of the external case 41 is $24 \times Q_{41}/V_{41}$.

The air exchange rate $Q_{43}/V_{43}$ per hour of the internal case 43 and the air exchange rate $n_{43}$ of the internal case 43 can be calculated in the same manner.

In the external case 41, there is almost no clearance between the case main body 45 and the resin lid 46, so that air inside the external case 41 is replaced with air outside the external case 41 through the waterproof and moisture-permeable film 50. Thus, the amount of air exchanged through the waterproof and moisture-permeable film 50 within an hour is $Q_{41}$.

In the internal case 43, air inside the internal case 43 is replaced with air outside the internal case 43 through the clearance between the lid 53 and the device housing part 52 and the clearance between the device housing part 52 and the battery housing part 51. Thus, the amount of air exchanged through the clearance of the internal case 43 within an hour is $Q_{43}$.

In Embodiment 1, $Q_{41}$ is smaller than $Q_{43}$, and the air volume $V_{41}$ of the external case 41 is larger than the air volume $V_{43}$ of the internal case 43. Accordingly, the air exchange rate $n_{43}$ of the internal case 43 is higher than the air exchange rate $n_{41}$ of the external case 41.

Thus, air inside the case is more easily exchanged with air outside the case in the internal case 43 than in the external case 41. As a result, even when air inside the internal case 43 is warmed by the battery module 42, this air is easily replaced with air at a comparatively low temperature present outside the internal case 43, so that the temperature of the battery module 42 does not easily rise.

It is therefore possible to prevent an excessive rise of the temperature inside the internal battery pack 17 even when the internal battery pack 17 is not provided with a cooling device.

As the external case 41 has a low air exchange rate $n_{41}$, external foreign substances such as dust can be kept from entering the external battery pack 16, and various troubles caused by entry of such foreign substances can be avoided.

The external battery pack 16 is provided on the bottom surface 15 of the vehicle 1, and the external battery pack 16 is exposed to outside air. Therefore, the external battery pack 16 can be appropriately cooled by a traveling wind blowing on the external battery pack 16 as the vehicle 1 runs.

Here, in Embodiment 1, the example in which the air volume of the external battery pack 16 is larger than the air volume of the internal battery pack 17 has been described. Also in the case where the air volume of the internal battery pack 17 is larger than the air volume of the external battery pack 16, it is possible to keep foreign substances from entering the external battery pack 16 and secure the cooling performance of the internal battery pack 17 if the air exchange rate $n_{43}$ of the internal case 43 is higher than the air exchange rate $n_{41}$ of the external case 41.

Specifically, in the case where the air exchange rate $n_{43}$ of the internal case 43 is higher than the air exchange rate $n_{41}$ of the external case 41, the amount of air exchanged in the internal case 43 increases as the air volume $V_{43}$ of the internal case 43 increases. As a result, warmed air inside the internal case 43 is easily replaced with air at a comparatively low temperature present outside the internal case 43, so that the temperature rise of the battery module 42 is suppressed.

Figure 4:
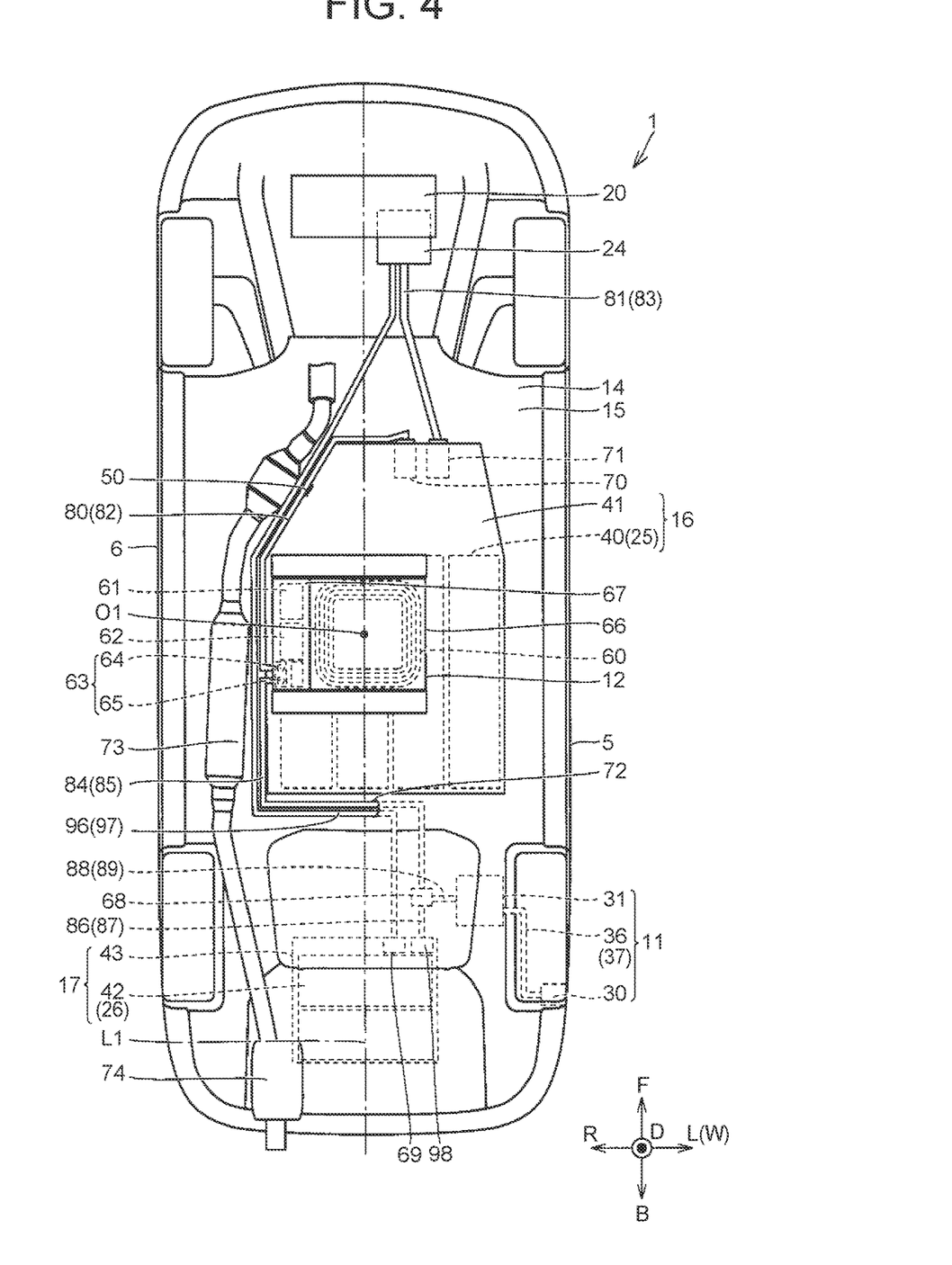
FIG. 4 is a plan view of the vehicle 1 as seen from below.

FIG. 4 is a plan view of the vehicle 1 as seen from below. As shown in FIG. 4, the electric power receiving device 12 is provided on a lower surface of the external battery pack 16. The electric power receiving device 12 includes a coil housing case 66 and a device housing case 67. The electric power receiving device 12 includes an electric power receiving coil 60 housed inside the coil housing case 66, and a capacitor 61, a rectifier 62, and a terminal block 63 housed inside the device housing case 67.

The electric power receiving coil 60 is a spiral coil that is formed so as to surround an axis of winding O1 extending in an upper-lower direction. Reference sign L1 indicated in FIG. 4 is a centerline L1 that extends in the front-back direction of the vehicle 1 and passes through a center part of the vehicle 1 in a width direction. When the electric power receiving coil 60 is seen from below the vehicle 1, the electric power receiving device 12 is disposed so that the electric power receiving coil 60 lies on the centerline L1. In the example shown in FIG. 4, the axis of winding O1 of the electric power receiving coil 60 and the centerline L1 intersect with each other.

The coil housing case 66 and the device housing case 67 are provided so that upper surfaces thereof are in contact with the external case 41. Thus, when the electric power receiving device 12 rises in temperature while receiving electric power, heat of the electric power receiving device 12 is released to the external case 41 through a contact portion between the coil housing case 66 and the external case 41 and a contact portion between the device housing case 67 and the external case 41. It is therefore possible to suppress the temperature rise of the electric power receiving device 12 while the electric power receiving device 12 is receiving electric power.

The device housing case 67 is disposed closer to a right side surface 6 of the vehicle 1 than the coil housing case 66 is, and the capacitor 61, the rectifier 62, and the terminal block 63 are disposed closer to the right side surface 6 of the vehicle 1 than the electric power receiving coil 60 is. For example, the device housing case 67 is made of a metal such as aluminum, and the coil housing case 66 is made of a material such as a resin that allows passage of a magnetic flux. The terminal block 63 includes a terminal 64 and a terminal 65. A charging relay 70 and an SMR 71 are provided on a front-end side of the external battery pack 16.

The vehicle 1 includes an electric power cable 80 that is connected to the charging relay 70 and the terminal 64, and an electric power cable 81 that connects the SMR 71 and the PCU 24 to each other. The electric power cable 80 is led out from the terminal 64 toward the right side surface 6. The electric power cable 80 extends in the forward direction F along a side surface of the external case 41 on the side of the right side surface 6. Upon reaching a front end surface of the external case 41, the electric power cable 80 extends along the front end surface of the external case 41 and is connected to the charging relay 70. The charging relay 70 is connected to the battery module 40.

The electric power cable 81 is led out from the SMR 71 in the forward direction F and is connected to the PCU 24.

The vehicle 1 includes an electric power cable 84 that connects the terminal 65 and a connection part 68 to each other. The connection part 68 is provided inside the vehicle 1, and when the vehicle 1 is seen in a plan view from below, the connection part 68 is disposed further on the back side than the external battery pack 16.

The electric power cable 84 is led out from the terminal 65 toward the right side surface 6, and led out in the backward direction B along the side surface of the external case 41 on the side of the right side surface 6. Upon reaching a back end surface of the external case 41, the electric power cable 84 extends along the back end surface of the external case 41, and is led into the vehicle 1 through a hole 72 formed in the floor panel 14. After entering the vehicle 1 through the hole 72, the electric power cable 84 is connected to the connection part 68.

A charging relay 98 and an SMR 69 are provided inside the internal case 43 of the internal battery pack 17. The vehicle 1 includes an electric power cable 86 that connects the charging relay 98 and the connection part 68 to each other. The vehicle 1 includes an electric power cable 96 that connects the SMR 69 housed in the internal case 43 and the PCU 24 to each other. The electric power cable 96 extends from the SMR 69 in the forward direction F of the vehicle 1, and is led out to the bottom surface 15 of the vehicle 1 through the hole 72. Then, the electric power cable 96 extends along the back end surface of the external case 41 and the side surface of the external case 41 on the side of the right side surface 6, and is connected to the PCU 24. The SMR 69 is connected to the battery module 42.

The charging device 11 includes an electric power cable 36 that connects the inlet 30 and the rectifier 31 to each other, and the electric power cable 36 includes an electric power line 37. The vehicle 1 includes an electric power cable 88 that connects the rectifier 31 and the connection part 68 to each other. The electric power cables 80, 81, 84, 86, 88, 96 include electric power lines 82, 83, 85, 87, 89, 97 and insulating films covering the electric power lines 82, 83, 85, 87, 89, 97.

Here, the cable length of the electric power cable 80 connecting the electric power receiving device 12 and the external battery pack 16 to each other is shorter than the total cable length of the electric power cables 84, 86 connecting the electric power receiving device 12 and the internal battery pack 17 to each other. Accordingly, for example, when another vehicle crashes into the vehicle 1, the possibility of breakage of at least one of the electric power cable 84 and the electric power cable 86 is higher than the possibility of breakage of the electric power cable 80.

If the electric power cable 80 is intact, electric power received by the electric power receiving device 12 can be supplied to the external battery pack 16. Since the battery capacity of the battery module 40 is larger than the battery capacity of the battery module 42, charging the battery module 40 can secure a long range over which the vehicle 1 can run on a driving force from the rotating electric machine 21 with the engine 20 stopped.

The external battery pack 16 is disposed further on the back side of the vehicle 1 than the PCU 24, and the internal battery pack 17 is disposed further on the back side of the vehicle 1 than the external battery pack 16. Accordingly, the cable length of the electric power cable 81 connecting the SMR 71 and the PCU 24 to each other is shorter than the cable length of the electric power cable 96 connecting the SMR 69 and the PCU 24 to each other. Thus, when another vehicle etc. crashes into the vehicle 1, the possibility of breakage of the electric power cable 81 is lower than the possibility of breakage of the electric power cable 96. If the electric power cable 81 is left unbroken, the vehicle 1 can run on electric power from the battery module 40. Moreover, even when the engine 20 is also damaged by the crash, the vehicle 1 can maintain the running capability if the electric power cable 81, the rotating electric machine 21, the PCU 24, etc. are in good condition. In this case, since the battery capacity of the battery module 40 is larger than the battery capacity of the battery module 42, a comparatively long range can be secured even with the engine 20 stopped.

As shown in FIG. 4, the inlet 30 is provided in the left side surface 5 of the vehicle 1, and the electric power receiving device 12 is provided on the outer side of the vehicle, on the lower surface of the external case 41. Thus, for example, even when a fallen object placed on a ground surface and the electric power receiving device 12 come in contact with each other while the vehicle 1 is running, and the electric power receiving device 12 is damaged, damage to the inlet 30 can be prevented. As damage to the inlet 30 is avoided, the charging function of the charging device 11 can be secured. When another vehicle crashes into the left side surface 5 of the vehicle 1, the inlet 30 is likely to be damaged, while damage to the electric power receiving device 12 can be prevented and thus the charging function of the electric power receiving device 12 can be secured. In the example shown in FIG. 4 etc., the inlet 30 is provided in the left side surface 5 of the vehicle 1, but the inlet 30 may be provided in the right side surface 6, or may be provided in a front end surface or a back end surface of the vehicle 1. In short, the inlet 30 can be provided in a peripheral surface of the vehicle 1.

The vehicle 1 includes an exhaust pipe 73 and a muffler 74. The muffler 74 is provided on a back end side of the vehicle 1, and the exhaust pipe 73 is provided so as to connect the muffler 74 and the engine 20 to each other. The exhaust pipe 73 extends in the front-rear direction of the vehicle 1, and is disposed closer to the right side surface 6 than the external case 41 is.

Figure 5:
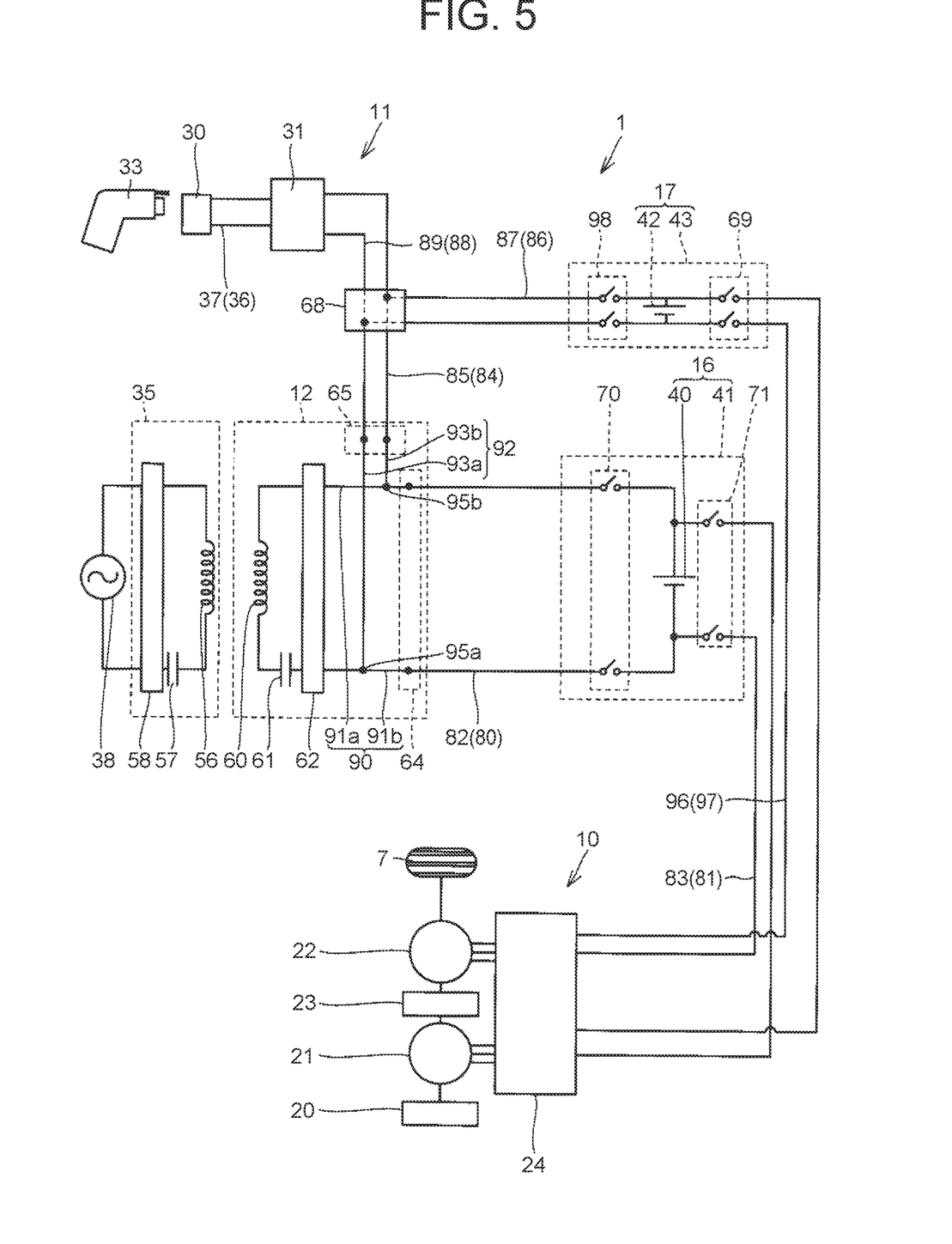
FIG. 5 is a block diagram schematically showing the vehicle 1.

FIG. 5 is a block diagram schematically showing the vehicle 1. In FIG. 5, when the vehicle 1 runs, the charging relays 70, 98 are turned off and the SMR 71 and the SMR 69 are turned on. Electric power is supplied from the external battery pack 16 and the internal battery pack 17 to the PCU 24. The rotating electric machine 22 and the engine 20 drive the vehicle 1 to run.

The electric power transmission device 35 includes an electric power transmission coil 56, a capacitor 57, and a converter 58. The converter 58 adjusts the frequency, voltage, etc. of alternating-current power supplied from the power source 38. The electric power transmission coil 56 and the capacitor 57 are connected in series, and the electric power transmission coil 56 and the capacitor 57 are connected to the converter 58. Here, an LC resonator is formed by the electric power transmission coil 56 and the capacitor 57.

The electric power receiving device 12 includes an electric power line 90 that connects the rectifier 62 and the terminal 64 to each other, and the electric power line 90 includes a wire 91a and a wire 91b.

The electric power receiving device 12 includes an electric power line 92 that is connected to the terminal 65 and the electric power line 90. The electric power line 92 includes a wire 93a that is connected to a node 95a of the wire 91a, and a wire 93b that is connected to a node 95b of the wire 91b.

When the vehicle 1 charges the external battery pack 16 and the internal battery pack 17 with electric power transmitted from the electric power transmission device 35, the charging relay 70 and the charging relay 98 are turned on and the SMR 71 and the SMR 69 are turned off. The converter 58 adjusts the frequency and the voltage of the alternating-current power supplied from the power source 38, and supplies the adjusted power to the electric power transmission coil 56 and the capacitor 57.

When this alternating-current power is supplied to the electric power transmission coil 56, an electromagnetic field is formed around the electric power transmission coil 56. The electric power receiving coil 60 of the electric power receiving device 12 receives electric power through this electromagnetic field. The rectifier 62 converts electric power received by the electric power receiving coil 60 into direct-current power and outputs this direct-current power. The direct-current power output from the rectifier 62 is supplied to the battery module 42 of the internal battery pack 17 through the electric power line 90, the electric power line 92, the terminal 65, the electric power line 85, the connection part 68, and the electric power line 87. Even when the direct-current power output from the rectifier 62 reaches the rectifier 31 in this process, the electric power from the rectifier 62 is prevented by the rectifier 31 from reaching the inlet 30.

The direct-current power output from the rectifier 62 is supplied to the battery module 40 of the external battery pack 16 through the electric power line 90, the terminal 64, the electric power line 82, and the charging relay 70.

Also when the vehicle 1 charges the external battery pack 16 and the internal battery pack 17 with electric power supplied from the inlet 30, the charging relay 70 and the charging relay 98 are turned on and the SMR 71 and the SMR 69 are turned off. Then, alternating-current power is supplied to the rectifier 31 from the charging connector 33 connected to the inlet 30. The rectifier 31 converts the supplied alternating-current power into direct-current power and outputs this direct-current power.

The direct-current power output from the rectifier 31 is supplied to the battery module 42 of the internal battery pack 17 through the electric power line 89, the connection part 68, and the electric power line 87. Moreover, the direct-current power output from the rectifier 31 is supplied to the battery module 40 of the external battery pack 16 through the electric power line 89, the connection part 68, the electric power line 85, the electric power line 92, the terminal 64, the electric power line 82, and the charging relay 70.

In the vehicle 1 thus configured, water can accumulate inside the external case 41 of the external battery pack 16. For example, when air outside the vehicle 1 has high temperature and humidity during the day, this hot and humid air enters the external case 41 through the waterproof and moisture-permeable film 50 shown in FIG. 4. As the air outside the vehicle 1 cools down during the night, the external case 41 can also cool down. In such cases, water vapor contained in the air inside the external case 41 can liquefy. As a result, water can accumulate inside the external case 41. In particular, the water inside the external case 41 can increase as this phenomenon occurs repeatedly.

In Embodiment 1, however, the exhaust pipe 73 is provided at a position adjacent to the external case 41 as shown in FIG. 4. When the vehicle 1 runs, high-temperature exhaust gas from the engine 20 flows into the exhaust pipe 73, raising the temperature of the exhaust pipe 73. As a result, a part of the external case 41 that faces the exhaust pipe 73 is heated to a high temperature by the heat from the exhaust pipe 73. When that part of the external case 41 reaches a high temperature, water inside the external case 41 evaporates upon reaching this high-temperature part. The water vapor can pass through the waterproof and moisture-permeable film 50, and thus the water vapor inside the external case 41 is discharged to the outside through the waterproof and moisture-permeable film 50. In this way, water inside the external case 41 can be discharged from the external case 41 to the outside.

Moreover, in Embodiment 1, the electric power receiving device 12 is disposed in contact with the lower surface of the external case 41. When the electric power receiving device 12 receives electric power, the temperature of the electric power receiving coil 60 rises as a current flows through the electric power receiving coil 60. The temperatures of the capacitor 61 and the rectifier 62 also rise. As a result, the temperature of the electric power receiving device 12 rises.

The heat of the electric power receiving device 12 is released to the external case 41 through the contact portion between the coil housing case 66 and the external case 41 and the contact portion between the device housing case 67 and the external case 41.

Thus, as the heat from the electric power receiving device 12 is transmitted to the external case 41, the temperature inside the external case 41 rises. It is therefore possible to vaporize water inside the external case 41 and discharge the water through the waterproof and moisture-permeable film 50 to the outside, even while the electric power receiving device 12 is receiving electric power.

Thus, the exhaust pipe 73 and the electric power receiving device 12 function as heat generators that evaporate water inside the external case 41.

Since the exhaust pipe 73 and the electric power receiving device 12 are disposed on a lower surface side of the floor panel 14 as shown in FIG. 4, heat from the exhaust pipe 73 and the electric power receiving device 12 rarely reaches the internal battery pack 17, so that the internal battery pack 17 is prevented from reaching a high temperature.

Here, when the electric power receiving device 12 receives electric power, an electromagnetic field is formed around the electric power receiving device 12. As the electric power receiving device 12 is fixed to the lower surface of the external case 41, the magnetic flux formed around the electric power receiving device 12 tries to enter the external case 41. However, the external case 41 is made of aluminum or an aluminum alloy, so that the magnetic flux trying to enter the external case 41 is likely to be reflected by a surface of the external case 41. As a result, only a small amount of magnetic flux enters the external case 41 while the electric power receiving device 12 is receiving electric power, so that the external case 41 can be prevented from reaching a high temperature.

Specifically, while the electric power receiving device 12 is receiving electric power, the external case 41 receives heat from the electric power receiving device 12, and at the same time is prevented from being warmed by the magnetic flux formed around the electric power receiving device 12. As a result, the external case 41 can be prevented from reaching an excessively high temperature while the electric power receiving device 12 is receiving electric power.

As shown in FIG. 4, the number of the battery units 25 of the battery module 40 is larger than the number of the battery units 26 of the battery module 42, and the battery units 25 are not stacked in a height direction of the vehicle 1 but instead disposed at intervals in the width direction of the vehicle 1.

Accordingly, the installation area of the battery module 40 is larger than the installation area of the battery module 42, and when the vehicle 1 is seen in a plan view from below, the area of the external case 41 of the external battery pack 16 is larger than the area of the battery module 42 of the internal battery pack 17.

As the area of the bottom surface of the external case 41 is large, a magnetic flux formed around the electric power receiving device 12 is kept from entering the floor panel 14. The floor panel 14 is made of iron or an alloy containing iron.

Accordingly, when an eddy current occurs on a surface of the floor panel 14 as the magnetic flux enters the floor panel 14, this surface is likely to reach a high temperature. In Embodiment 1, therefore, the lower surface of the external case 41 has a large area so as to keep the magnetic flux from entering the floor panel 14 and thereby prevent the floor panel 14 from reaching a high temperature.

In Embodiment 1, the example in which the electric power receiving device 12 is provided has been described, but the electric power receiving device 12 is not an essential component. For example, FIG. 6 is a bottom view showing a modified example.

Figure 6:
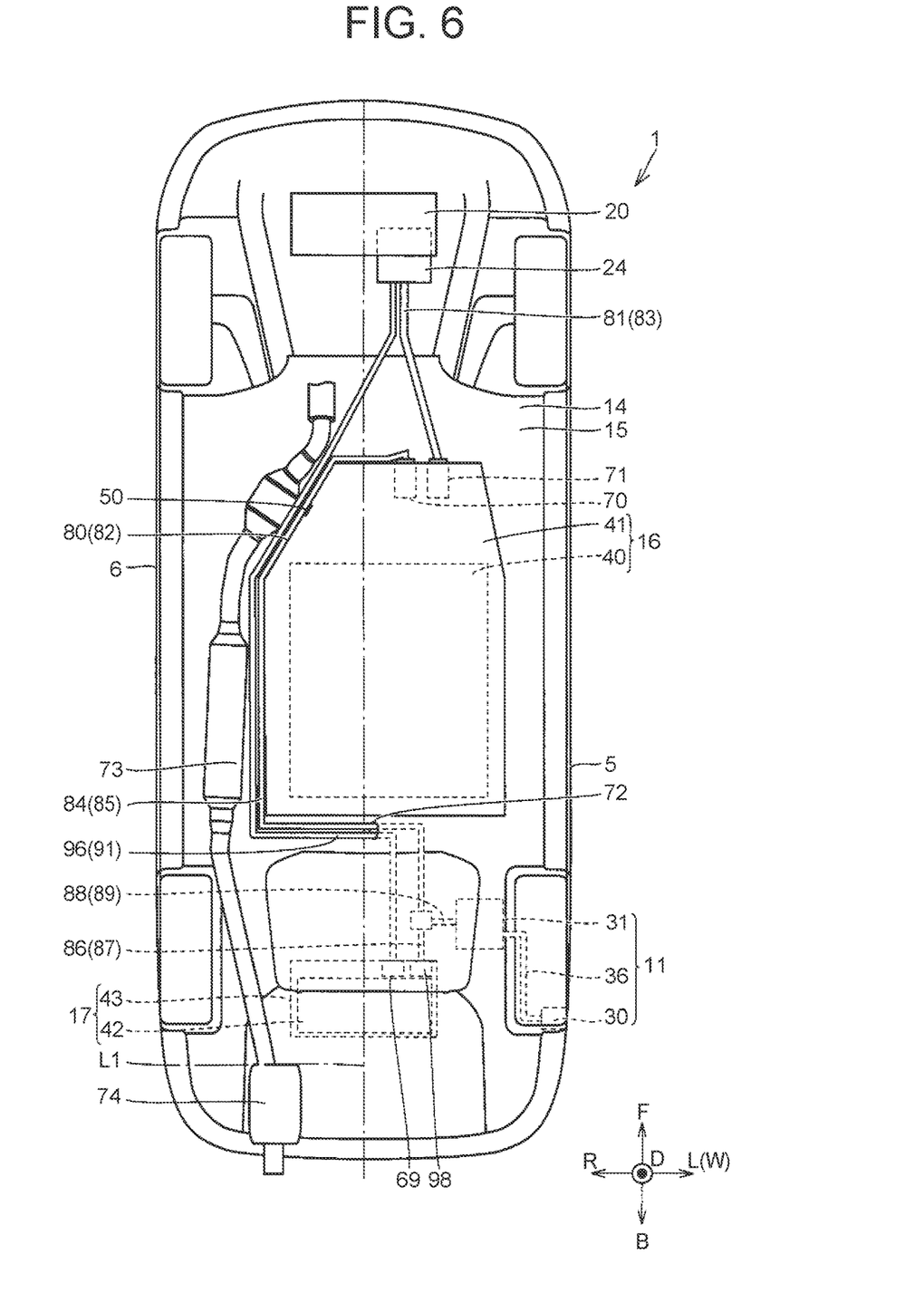
FIG. 6 is a bottom view showing a modified example.

As shown in FIG. 6, the present disclosure can also be applied to a vehicle that is not provided with the electric power receiving device 12. In the example shown in FIG. 6, it is possible to vaporize water inside the external case 41 by heat from the exhaust pipe 73, and to discharge the water through the waterproof and moisture-permeable film 50 to the outside of the external case 41.

<Embodiment 2> In Embodiment 1, the example in which a cooling device that cools the internal battery pack 17 and the external battery pack 16 is not provided has been described. In Embodiment 2, by contrast, an example in which a cooling device 100 that cools the external battery pack 16 and a cooling device 101 that cools the internal battery pack 17 are provided will be described.

Figure 7:
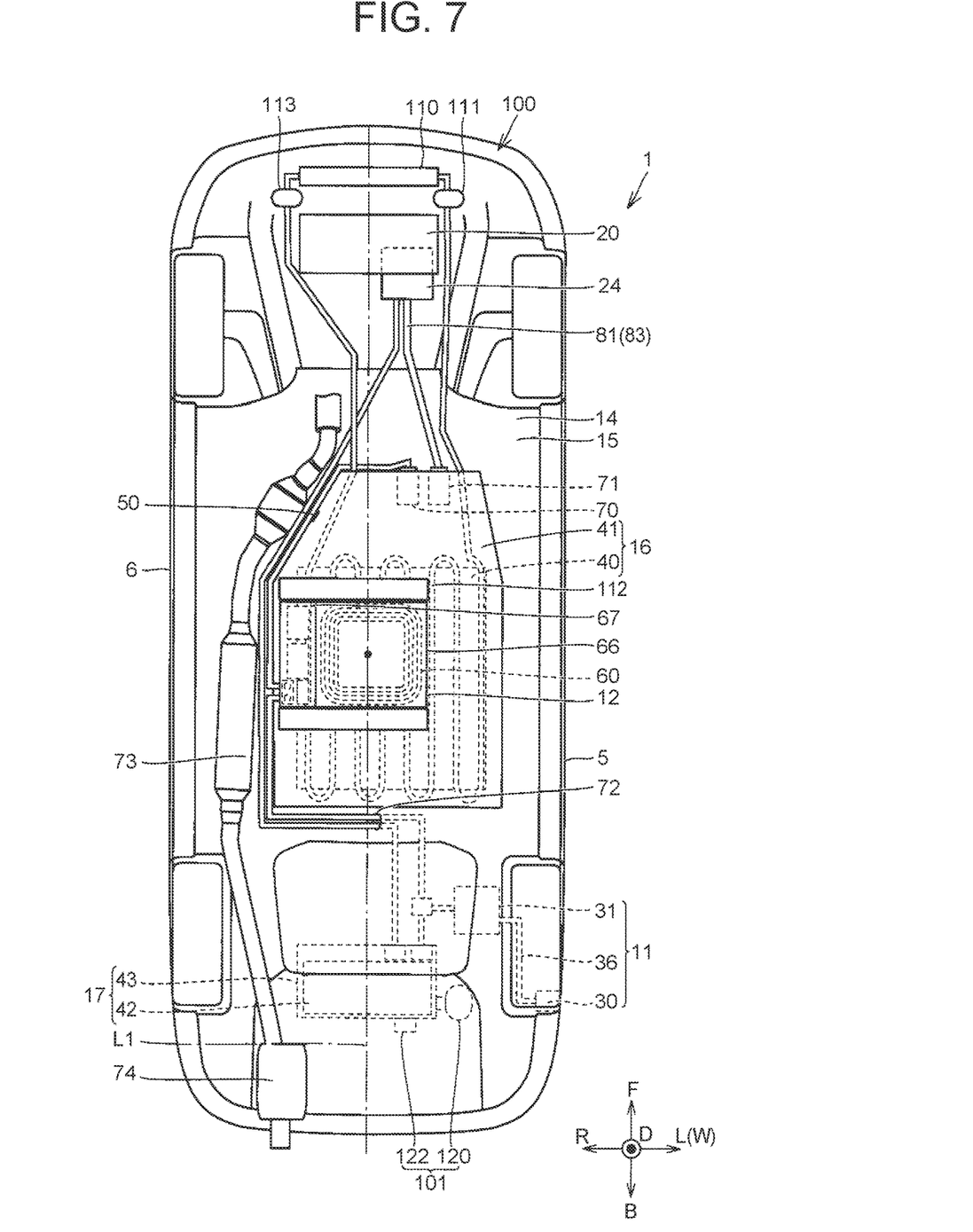
FIG. 7 is a bottom view of the vehicle 1 according to Embodiment 2 as seen from below.

FIG. 7 is a bottom view of the vehicle 1 according to Embodiment 2 as seen from below. As shown in FIG. 7, the vehicle 1 includes the cooling device 100 that cools the external battery pack 16 and the cooling device 101 that cools the internal battery pack 17.

The cooling device 100 includes a condenser 110, an expansion valve 111, an evaporator 112, and a compressor 113, and a coolant C1 circulates inside the cooling device 100.

The condenser 110 is provided on the front side of the vehicle 1, and cools the coolant C1 flowing through the condenser 110 with outside air. The low-temperature, high-pressure liquid coolant C1 is supplied from the condenser 110 to the expansion valve 111. The coolant C1 expands adiabatically in the expansion valve 111 so as to assume a form of low-temperature, low-pressure mist. The evaporator 112 is formed in a long tubular shape, and is disposed inside the external case 41, on a lower surface of the battery module 40.

While the coolant C1 flows through the evaporator 112, the coolant C1 absorbs heat from the battery module 40 and cools the battery module 40. By absorbing heat from the battery module 40, the coolant C1 turns into a low-pressure gas. The low-pressure gas coolant C1 is compressed in the compressor 113 into the high-temperature, high-pressure gas coolant C1. The coolant C1 is then cooled in the condenser 110 into the low-temperature, high-pressure liquid coolant C1.

Here, to maintain the high cooling performance of the evaporator 112, the tube of the evaporator 112 is placed in contact with the battery module 40 with an insulating film etc. interposed therebetween, and is disposed with a clearance to the external case 41.

If the battery module 40 is cooled with the evaporator 112 thus disposed, water vapor contained in air inside the external case 41 can condense and adhere to a surface of the evaporator 112. It is feared that a condensate may accumulate inside the external case 41 as the water adhering to the surface of the evaporator 112 drips onto a bottom surface of the external case 41.

Even in such a case, the external case 41 is heated by the heat from the exhaust pipe 73 and the electric power receiving device 12, so that the condensate dripping onto the bottom surface of the external case 41 can be evaporated.

Specifically, while the vehicle 1 is running, exhaust gas from the engine 20 flows through the exhaust pipe 73, raising the temperature of the exhaust pipe 73. Since the exhaust pipe 73 is disposed on the side of the right side surface 6 relative to the external case 41, a part of a bottom plate 47 of the external case 41 located on the side of the right side surface 6 reaches a higher temperature than a part of the bottom plate 47 located on the side of the left side surface 5. Accordingly, evaporation of water having dripped onto the bottom surface of the external case 41 while the vehicle 1 is running can be promoted in the part of the bottom plate 47 of the external case 41 located on the side of the right side surface 6. The resulting water vapor is discharged to the outside of the external case 41 as air inside the external case 41 is exchanged.

While the vehicle 1 is standing still and the electric power receiving device 12 is receiving electric power, the external case 41 is warmed by the heat from the electric power receiving device 12, which can promote evaporation of the condensate having accumulated on the bottom surface of the external case 41. In particular, since the electric power receiving device 12 is provided on the bottom plate 47 of the external case 41, evaporation of the condensate having accumulated on the bottom surface of the external case 41 can be favorably promoted.

Here, the amount of current supplied to the battery modules 40, 42 when the battery modules 40, 42 are charged using the electric power receiving device 12 is smaller than the amount of current discharged from the battery modules 40, 42 while the vehicle 1 is running. Accordingly, the temperature of the battery module 40 while the electric power receiving device 12 is receiving electric power is lower than the temperature of the battery module 40 while the vehicle 1 is running.

Therefore, driving of the cooling device 100 may be stopped while the battery modules 40, 42 are being charged using the electric power receiving device 12. Stopping the driving of the cooling device 100 can suppress the condensation of water in the evaporator 112, and thus can suppress an increase of the condensate accumulating on the bottom surface of the external case 41.

The condensate evaporated by the heat from the exhaust pipe 73 and the electric power receiving device 12 is discharged as water vapor through the waterproof and moisture-permeable film 50 to the outside of the external case 41. In Embodiment 2, too, the air exchange rate of the external case 41 is lower than the air exchange rate of the internal case 43. Thus, foreign substances outside the external case 41 can be kept from entering the case.

The cooling device 101 includes a fan 120 and an exhaust duct 122. The fan 120 supplies air from inside the vehicle cabin into the internal case 43. Thus, the battery module 42 inside the internal case 43 is cooled. The exhaust duct 122 discharges air inside the internal case 43 into the vehicle cabin.

In this case, since the internal air is forcedly supplied by the cooling device 101 into the internal case 43, the air exchange rate of the internal case 43 is higher than the air exchange rate of the external case 41, and therefore the battery module 42 housed in the internal case 43 can be appropriately cooled.

In the above embodiments, the example in which the external battery pack 16 is directly exposed to the outside has been described. However, the external battery pack 16 in the present disclosure is not limited to being exposed to the outside.

Figure 8:
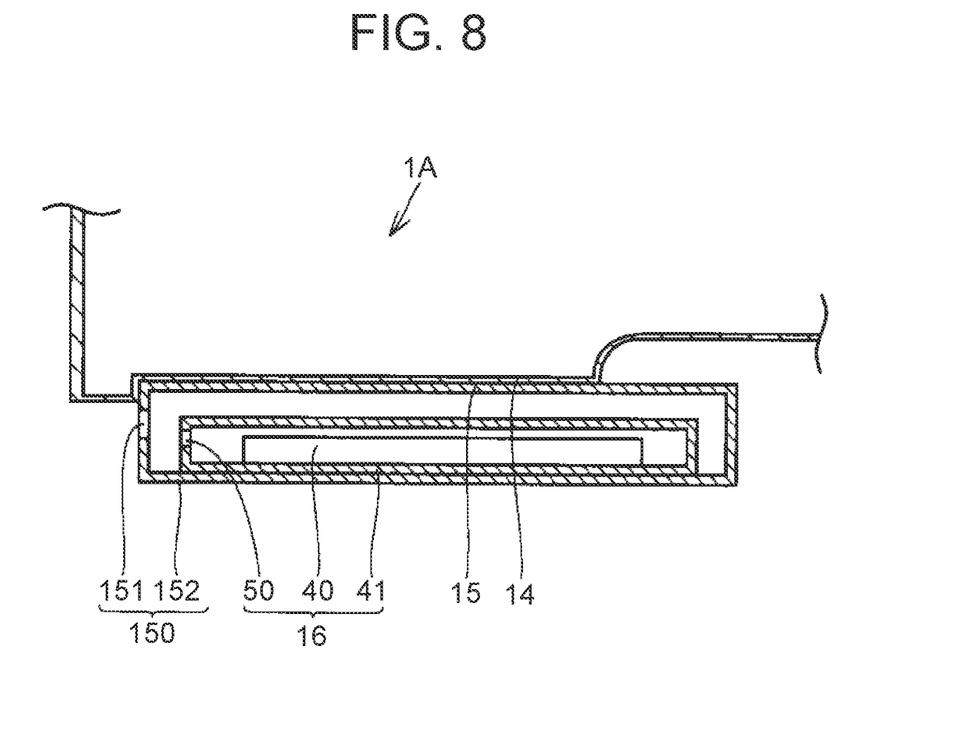
FIG. 8 is a sectional view schematically showing a modified example of the form of installation of the external battery pack 16.

FIG. 8 is a sectional view schematically showing a modified example of the form of installation of the external battery pack 16. In a vehicle 1A shown in FIG. 8, the vehicle 1A includes a protective case 150 disposed on the bottom surface 15 of the vehicle 1A, and the external battery pack 16 is housed in the protective case 150.

The protective case 150 includes a case main body 152 and an air intake opening 151 provided in the case main body 152. Through the air intake opening 151, air outside the vehicle 1A is taken into the protective case 150.

The air outside the vehicle 1A taken into the protective case 150 passes through the waterproof and moisture-permeable film 50 and enters the external case 41 of the external battery pack 16.

The air inside the external case 41 passes through the waterproof and moisture-permeable film 50 and enters the case main body 152, and then is discharged through the air intake opening 151 to the outside of the vehicle 1A.

Thus, in the example shown in FIG. 8, too, the external battery pack 16 is provided on the bottom surface 15 located on the outer side of the vehicle, and air outside the vehicle 1A can enter and exit the external battery pack 16.

In such an external battery pack 16, too, it is possible to keep foreign substances contained in air outside the vehicle from entering the external battery pack 16 by lowering the air exchange rate of the external case 41. Moreover, the external battery pack 16 can be indirectly cooled as the protective case 150 is cooled while the vehicle 1A is running.

Alternatively, a mesh cover covering the external battery pack 16 may be employed in place of the protective case 150 shown in FIG. 8. Also when the external battery pack 16 is covered with such a cover, it is possible to keep foreign substances from entering the external case 41 by lowering the air exchange rate of the external case 41. Moreover, the external battery pack 16 can be cooled as a traveling wind blows on the external battery pack 16 through the cover while the vehicle 1 is running.

Thus, in the present disclosure, it is not essential that the external battery pack 16 is placed in such a state that the external battery pack 16 can directly come in contact with air outside the vehicle. That is, the external battery pack 16 can be placed in such a state that air outside the vehicle can directly or indirectly enter the external battery pack 16, and that the external battery pack 16 can be directly or indirectly cooled by a traveling wind.

The embodiments disclosed herein should be regarded as in every respect merely illustrative and not limitative. The scope of the present disclosure is defined not by the above description but by the claims, and is intended to include all possible modifications that are equivalent in meaning and scope to the claims.

What is claimed is:

1. A vehicle comprising:
   a first battery pack disposed inside the vehicle and including a first battery module and a first case, the first case the ease housing the first battery module and having a slit through which air enters and exits the first case; and
   a second battery pack disposed on a bottom surface of the vehicle located on an outer side of the vehicle, the second battery pack including a second battery module and a second case, the second case housing the second battery module and having a peripheral wall, the peripheral wall having a hole covered with a waterproof and moisture-permeable film through which the air enters and exits the second case, wherein
   an air exchange rate of the first case is higher than an air exchange rate of the second case.

2. The vehicle according to claim 1, further comprising an engine and an exhaust pipe connected to the engine, wherein the exhaust pipe is provided on the bottom surface of the vehicle and disposed at a position adjacent to the second case.

3. The vehicle according to claim 1, further comprising an electric power receiving device that is configured to receive electric power contactlessly from an electric power transmission device provided outside the vehicle, wherein the electric power receiving device is provided on a lower surface of the second case.

4. The vehicle according to claim 3, wherein
   when the second case and the first case are seen in a plan view from below the vehicle, an area of the second case is larger than an area of the first case, and
   the electric power receiving device is disposed on the lower surface of the second case.

5. The vehicle according to claim 4, wherein the second case is made of an alloy containing aluminum.

6. The vehicle according to claim 3, further comprising a charging inlet to which a charging connector provided outside the vehicle is to be connected, wherein:
   the charging inlet is electrically connected to the first battery module and the second battery module; and
   the charging inlet is provided in a peripheral surface of the vehicle.

7. The vehicle according to claim 3, further comprising:
   a first electric power cable connected to the electric power receiving device and the second battery pack; and
   a second electric power cable connected to the electric power receiving device and the first battery pack, wherein
   a battery capacity of the second battery module is larger than a battery capacity of the first battery module, and
   a length of the first electric power cable is shorter than a length of the second electric power cable.

* * * * *